United States Patent
Li et al.

(10) Patent No.: US 12,163,080 B2
(45) Date of Patent: Dec. 10, 2024

(54) LIQUID CRYSTAL (LC) COMPOSITION WITH EXTREMELY-LOW DIELECTRIC LOSS AND HIGH-FREQUENCY COMPONENT INCLUDING SAME

(71) Applicant: XI'AN MODERN CHEMISTRY RESEARCH INSTITUTE, Shaanxi (CN)

(72) Inventors: Jian Li, Shaanxi (CN); Minggang Hu, Shaanxi (CN); Juanli Li, Shaanxi (CN); Zhaoyi Che, Shaanxi (CN); Lingchao Mo, Shaanxi (CN); Lu Zhang, Shaanxi (CN); Zhongwei An, Shaanxi (CN); Danyang Wan, Shaanxi (CN); Xiaozhe Yang, Shaanxi (CN); Cheng Yang, Shaanxi (CN); Fengjiao Shi, Shaanxi (CN)

(73) Assignee: XI'AN MODERN CHEMISTRY RESEARCH INSTITUTE, Xi'an (CN)

( * ) Notice: Subject to any disclaimer, the term of this patent is extended or adjusted under 35 U.S.C. 154(b) by 0 days.

(21) Appl. No.: 17/918,904

(22) PCT Filed: Aug. 21, 2020

(86) PCT No.: PCT/CN2020/110484
§ 371 (c)(1),
(2) Date: Oct. 14, 2022

(87) PCT Pub. No.: WO2021/208315
PCT Pub. Date: Oct. 21, 2021

(65) Prior Publication Data
US 2023/0235228 A1    Jul. 27, 2023

(30) Foreign Application Priority Data
Apr. 14, 2020   (CN) .......................... 202010288568.3

(51) Int. Cl.
*G02F 1/1333*    (2006.01)
*C09K 19/12*     (2006.01)
(Continued)

(52) U.S. Cl.
CPC .............. *C09K 19/12* (2013.01); *C09K 19/18* (2013.01); *C09K 19/3003* (2013.01);
(Continued)

(58) Field of Classification Search
CPC ........ C09K 19/04; C09K 19/12; C09K 19/18; C09K 19/3003; C09K 19/3059; C09K 19/44; C09K 19/126; C09K 19/3098; C09K 2019/122; C09K 2019/123; C09K 2019/124; C09K 2019/127; C09K 2019/128; C09K 2019/181;
(Continued)

(56) References Cited

U.S. PATENT DOCUMENTS

| 10,023,798 | B2 * | 7/2018 | Lapanik ............ C09K 19/3003 |
| 2019/0292458 | A1 | 9/2019 | Klass et al. |
| 2023/0235228 | A1 * | 7/2023 | Li ....................... C09K 19/04 |
| | | | 252/299.63 |

FOREIGN PATENT DOCUMENTS

| CN | 103429704 A | 12/2013 |
| CN | 103443245 A | 12/2013 |

(Continued)

OTHER PUBLICATIONS

Stefan Müller et al., Tunable Passive Phase Shifter for Microwave Applications using Highly Anisotropic Liquid Crystals, 2004 IEEE MTT-S International Microwave Symposium Digest, 2004, pp. 1153-1156.

Richard James et al., Characterisation and Applications of Nematic Liquid Crystals in Microwave Devices, Molecular Crystals and Liquid Crystals, Jun. 14, 2011, pp. 196/[718]-203[725], vol. 542, No. 1.

Jun Li et al., High temperature-gradient refractive index liquid crystals, Optics Express, May 3, 2004, pp. 2002-2010, vol. 12, No. 9.

Jun Li et al., High dno/dT Liquid Crystals and their Applications in a Thermally Tunable Liquid Crystal Photonic Crystal Fiber, Molecular Crystals and Liquid Crystals, Sep. 2006, pp. 355-370, vol. 453.

(Continued)

*Primary Examiner* — Geraldina Visconti

(57) ABSTRACT

Disclosed are a liquid crystal (LC) composition and a high-frequency component including the same. The LC composition includes one or more selected from compounds shown in structural formula (I) and one or more selected from compounds shown in structural formula (II):

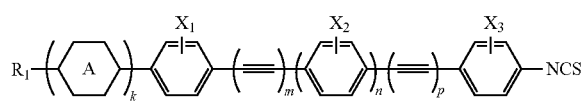

where $R_1$ is selected from alkyl with 1 to 10 carbon atoms, alkenyl with 2 to 10 carbon atoms, fluorinated alkyl, fluorinated alkenyl, and cycloalkyl; one of $X_1$, $X_2$, and $X_3$ is methyl or chlorine, and the other two are hydrogen; k, m, n, and p are 0 or 1; and ring A is selected from a benzene ring, cyclohexane, and cyclohexene;

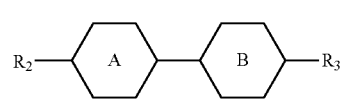

where $R_2$ and $R_3$ each are selected from alkyl with 1 to 10 carbon atoms, alkenyl with 2 to 10 carbon atoms, fluorinated alkyl, fluorinated alkenyl, cycloalkyl, halogen, and NCS; and ring A and ring B each are selected from a benzene ring, cyclohexane, and cyclohexene.

14 Claims, No Drawings

(51) Int. Cl.
*C09K 19/18* (2006.01)
*C09K 19/30* (2006.01)

(52) U.S. Cl.
CPC .... *C09K 19/3059* (2013.01); *C09K 2019/122* (2013.01); *C09K 2019/123* (2013.01); *C09K 2019/124* (2013.01); *C09K 2019/181* (2013.01); *C09K 2019/183* (2013.01); *C09K 2019/188* (2013.01); *C09K 2019/3016* (2013.01); *C09K 2019/3025* (2013.01); *C09K 2019/3063* (2013.01)

(58) Field of Classification Search
CPC ........ C09K 2019/183; C09K 2019/188; C09K 2019/3016; C09K 2019/3025; C09K 2019/3063; C09K 3063/3004; C09K 3063/3009; C09K 3063/3019; G02F 1/1333
See application file for complete search history.

(56) References Cited

FOREIGN PATENT DOCUMENTS

| | | |
|---|---|---|
| CN | 105368465 A | 3/2016 |
| CN | 107955630 A | 4/2018 |
| CN | 109716158 A | 5/2019 |
| CN | 110499163 A | 11/2019 |
| WO | WO 2019/052972 A1 * | 3/2019 ............. C09K 19/18 |

OTHER PUBLICATIONS

Andreas Penirschke et al., Cavity Perturbation Method for Characterization of Liquid Crystals up to 35 GHZ, 34th European Microwave Conference—Amsterdam, 2004, pp. 545-548.

International Search Report of PCT Patent Application No. PCT/CN2020/110484 issued on Dec. 30, 2020.

* cited by examiner

LIQUID CRYSTAL (LC) COMPOSITION WITH EXTREMELY-LOW DIELECTRIC LOSS AND HIGH-FREQUENCY COMPONENT INCLUDING SAME

TECHNICAL FIELD

The present disclosure belongs to the technical field of liquid crystal (LC) materials, and in particular relates to an LC composition with extremely-low dielectric loss that is suitable for filters, adjustable frequency-selective surfaces (FSSs), microwave phase shifters, microwave phased array antennas, or the like, and a high-frequency component including the same.

BACKGROUND

LC materials are widely used in optoelectronic display devices. In recent years, it has also been proposed that LC materials can be used for high-frequency components such as microwave phase shifters. For example, LC-based microwave phase shifters have been reported in the following literatures:

Muller S. et al. (2004). Tunable passive phase shifter for microwave applications using highly anisotropic liquid crystals. Microwave Symposium Digest, 2004 IEEE MTT-S International.

The dielectric tunability of an LC material in a microwave phase shifter determines the tuning capability of the microwave phase shifter. The dielectric tunability ($\tau$) of an LC material is determined by the dielectric anisotropy ($\Delta\varepsilon$) of the LC material at high frequencies and a dielectric constant ($\varepsilon_{//}$) in a parallel direction of molecules:

$$\tau=\Delta\varepsilon/\varepsilon_{//}$$

A dielectric loss of an LC material is an important factor affecting an insertion loss of a corresponding microwave device. In order to fabricate a high-performance LC microwave device, it is necessary to reduce a dielectric loss of a corresponding LC material. A loss tangent of an LC material varies with an LC molecule orientation and an electric field direction, that is, losses in long axis and short axis directions of an LC molecule are different. When a loss of an LC material is calculated, a maximum loss value is generally adopted, that is, max(tan $\delta_{//}$, tan $\delta_\perp$) is adopted as a loss of the LC material.

In order to comprehensively evaluate the performance parameters of an LC material under microwave, a quality factor ($\eta$) parameter is introduced:

$$\eta=\tau/\max(\tan\delta_{//},\tan\delta_\perp).$$

LC materials or high-frequency components need to have large dielectric tunability ($\tau$), low loss (tan $\delta_{//}$, tan $\delta_\perp$), and high quality factor ($\eta$). The existing disclosed LC materials for high-frequency components have large dielectric loss, such that corresponding high-frequency components have large insertion loss and low working efficiency, which becomes a technical bottleneck for the industrialization of LC-based microwave devices. Therefore, it is urgent to achieve the reduction in dielectric loss for LC materials.

In addition, in order to meet practical application requirements, LC materials for high-frequency components also need to have a wide operating temperature range, especially the performance at a low operating temperature needs to be improved. In order to meet the requirements of fast switching work of high-frequency components, LC materials also need to have low rotational viscosity. In order to allow high-frequency components to work under the driving of an electric field, LC materials also need to have an appropriate dielectric constant at a low frequency such as 1 KHz.

A dielectric constant of an LC material at a high frequency is related to the birefringence of LC, as shown in the following formula:

$$\Delta n=n_e-n_o=\sqrt{\varepsilon_{//}}-\sqrt{\varepsilon_\perp}$$

Thus, in order to obtain a high dielectric constant, an LC material also needs to have high birefringence.

The existing commercial high-birefringence LC materials, such as cyanobiphenyl or terphenyl-containing LC materials E7 and E44 reported in "Characterisation and Applications of Nematic Liquid Crystals in Microwave Devices", Molecular Crystals and Liquid Crystals, 2011, 542 (1): 196/[718]-203/[725], have the disadvantages of low tunability and large loss at high frequencies.

Patent CN103443245A discloses an LC medium including a bis-diphenylacetylene LC material, which may have a structure shown in the following formula:

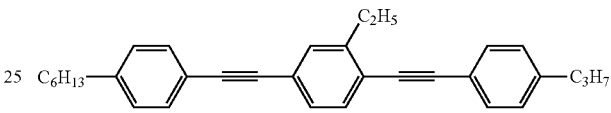

Although the above compound has a high quality factor at a high frequency, the rotational viscosity ($\gamma_1$) of the above compound is as high as 2,100 mPa·s, which leads to the defect of slow response. Moreover, the above compound has a small dielectric constant only of 0.8 at a low frequency.

A fluorobenzyne LC compound is disclosed in Patent CN 103429704 A:

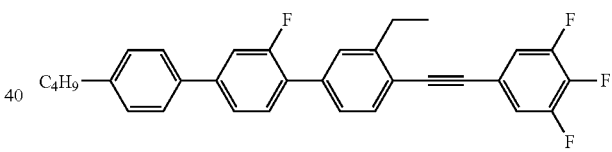

Although the compound has large birefringence ($\Delta n=0.35$) and prominent performance at a high frequency, the rotational viscosity $\gamma_1$ of the compound is 1,300 mPa·s, resulting in slow response.

CN107955630A and CN105368465A each disclose an LC composition with an NCS group as a molecular end and a fluorine-substituted benzene ring as a molecular skeleton. The LC composition has large dielectric constant and high tunability at a high frequency, but has large dielectric loss. In embodiments disclosed in the above patents, a maximum dielectric loss tan $\delta_\perp$ (19 GHz) is 0.01 or above.

CN110499163A and US2019292458A1 each disclose an LC composition with an NCS group as a molecular end and a fluorine-substituted benzene ring as a molecular skeleton. In embodiments disclosed in the above patents, a maximum dielectric loss tan $\delta_\perp$ (19 GHz) is greater than or equal to 0.083.

SUMMARY (I) Technical Problems to be Solved

In order to overcome the problems existing in the background art, the present disclosure provides an LC composition that has high dielectric tunability at a high frequency, an extremely-low dielectric loss, a wide nematic phase temperature range, low rotational viscosity, and a large dielectric constant at a low frequency, and a high-frequency component including the same.

(II) Technical Solutions

In order to solve the above technical problems, the present disclosure provides an LC composition for a high-frequency component, including one or more selected from the group consisting of compounds shown in structural formula (I) and one or more selected from the group consisting of compounds shown in structural formula (II):

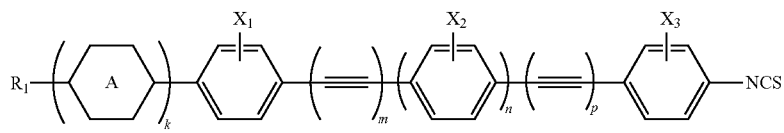

I where $R_1$ is selected from the group consisting of alkyl with 1 to 10 carbon atoms, alkenyl with 2 to 10 carbon atoms, fluorinated alkyl, fluorinated alkenyl, and cycloalkyl; one of $X_1$, $X_2$, and $X_3$ is methyl or chlorine, and the other two are hydrogen; k, m, n, and p are 0 or 1; and ring A is selected from the group consisting of a benzene ring, cyclohexane, and cyclohexene;

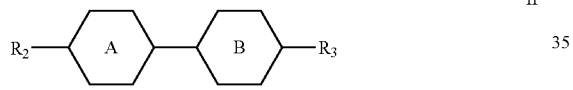

II where $R_2$ and $R_3$ each are selected from the group consisting of alkyl with 1 to 10 carbon atoms, alkenyl with 2 to 10 carbon atoms, fluorinated alkyl, fluorinated alkenyl, cycloalkyl, halogen, and NCS; and ring A and ring B each are selected from the group consisting of a benzene ring, cyclohexane, and cyclohexene.

Further, the compounds shown in structural formula (I) include one or more selected from the group consisting of compounds shown in structural formula I-A to structural formula I-L:

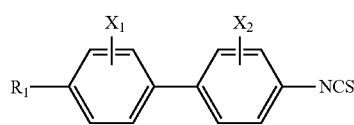

I-A

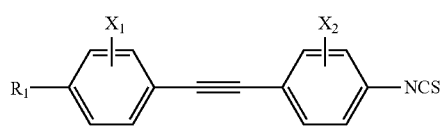

I-B

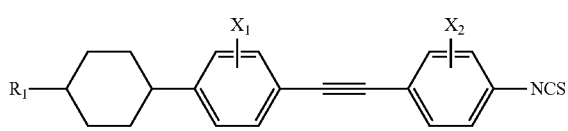

I-C

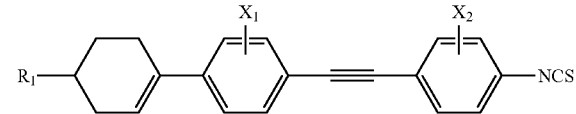

I-D

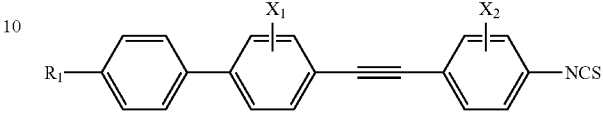

I-E

-continued

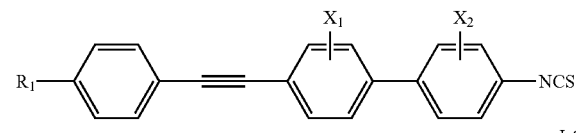

I-F

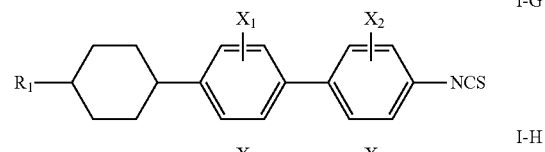

I-G

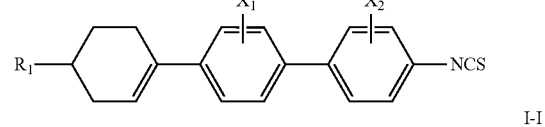

I-H

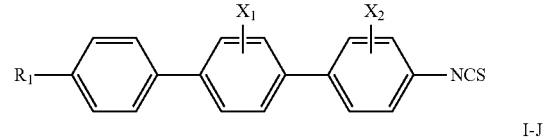

I-I

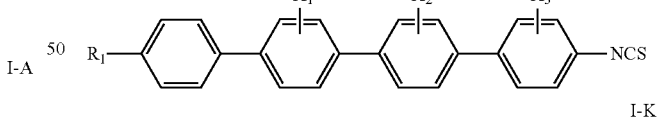

I-J

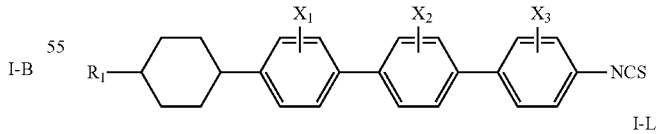

I-K

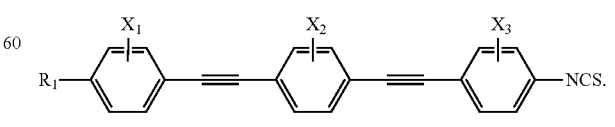

I-L

Further, the compounds shown in structural formula (II) are selected from the group consisting of the following structures:

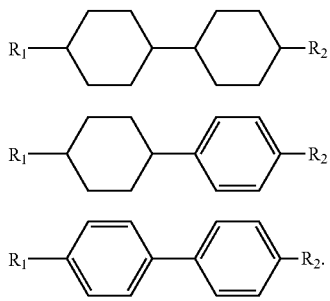

II-A

II-B

II-C

Further, a mass proportion of the compounds shown in structural formula (I) is 50% to 99% and a mass proportion of the compounds shown in structural formula (II) is 1% to 40%.

Further, the LC composition includes one or more selected from the group consisting of compounds shown in structural formula (III) in a mass proportion of 0% to 30%,

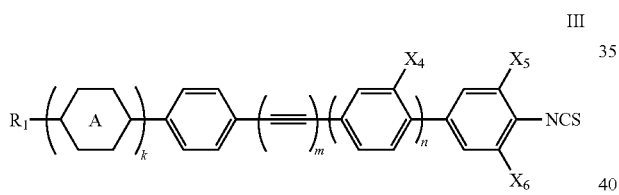

III where $R_1$ is selected from the group consisting of alkyl with 1 to 10 carbon atoms, alkenyl with 2 to 10 carbon atoms, fluorinated alkyl, and fluorinated alkenyl; $X_4$, $X_5$, and $X_6$ each are H or F; k, m, and n each are 0 or 1; and ring A is selected from the group consisting of a benzene ring, cyclohexane, and cyclohexene.

Further, the LC composition further includes 0.001% to 1% of an additive.

Further, the additive includes a 2,6-di-tert-butylphenol antioxidant or a light stabilizer.

Further, the LC composition has a vertical dielectric loss value tan $\delta_\perp$ less than or equal to 0.008 and a quality factor η larger than or equal to 40.

In addition, the present disclosure also provides a high-frequency component including the LC composition described above.

(III) Beneficial Effects

The present disclosure provides an LC composition that has high dielectric tunability at a high frequency, an extremely-low dielectric loss, a wide nematic phase temperature range, low rotational viscosity, and a large dielectric constant at a low frequency, and a high-frequency component including the same. The LC composition of the present disclosure can exhibit high dielectric tunability, extremely-low dielectric loss, and high-quality factor at a high frequency, expand a nematic phase operating temperature range, reduce the rotational viscosity, and enable a large dielectric constant at a low frequency. The LC composition of the present disclosure is suitable for filters, phase shifters, phased array radars, 5G communications, or the like.

DETAILED DESCRIPTION

In order to make the objectives, contents, and advantages of the present disclosure clearer, specific embodiments of the present disclosure will be further described in detail below with reference to examples.

The present disclosure provides an LC composition for a high-frequency component, including one or more selected from the group consisting of compounds shown in structural formula (I), structural formula (II), and structural formula (III):

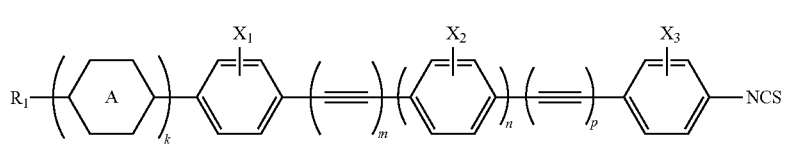

I where $R_1$ is selected from the group consisting of alkyl with 1 to 10 carbon atoms, alkenyl with 2 to 10 carbon atoms, fluorinated alkyl, fluorinated alkenyl, and cycloalkyl; one of $X_1$, $X_2$, and $X_3$ is methyl or chlorine, and the other two are hydrogen; k, m, n, and p are 0 or 1; and ring A is selected from the group consisting of a benzene ring, cyclohexane, and cyclohexene;

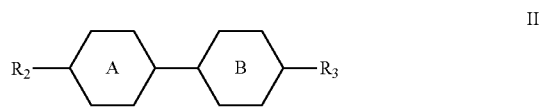

II where $R_2$ and $R_3$ each are selected from the group consisting of alkyl with 1 to 10 carbon atoms, alkenyl with 2 to 10 carbon atoms, fluorinated alkyl, fluorinated alkenyl, cycloalkyl, halogen, and NCS; and ring A and ring B each are selected from the group consisting of a benzene ring, cyclohexane, and cyclohexene;

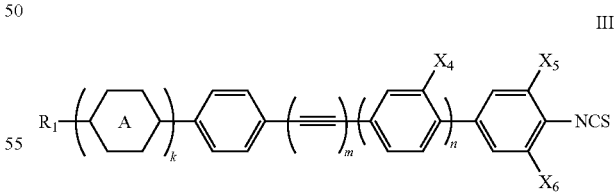

III where $R_1$ is selected from the group consisting of alkyl with 1 to 10 carbon atoms, alkenyl with 2 to 10 carbon atoms, fluorinated alkyl, and fluorinated alkenyl; $X_4$, $X_5$, and $X_6$ each are H or F; k, m, and n each are 0 or 1; and ring A is selected from the group consisting of a benzene ring, cyclohexane, and cyclohexene.

A compound shown in structural formula (I) further preferably has a structure selected from the group consisting of the following structures:

I-A
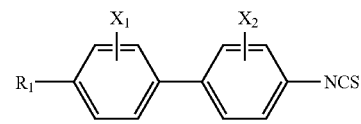
I-B
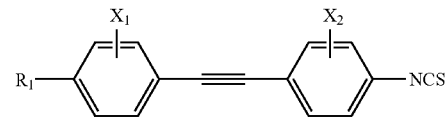
I-C
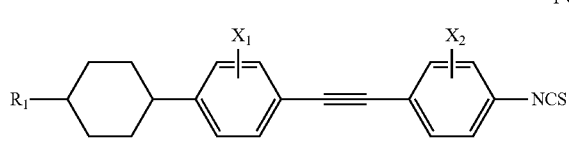
I-D
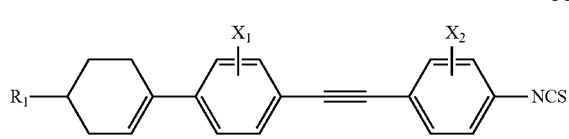
I-E
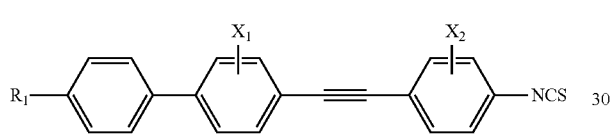
I-F
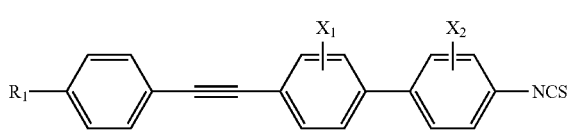
I-G
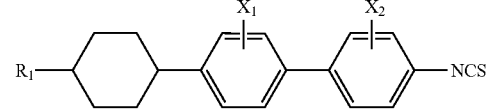
I-H
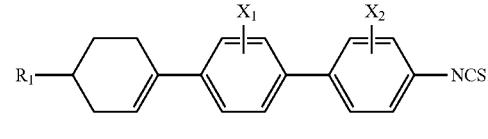
I-I
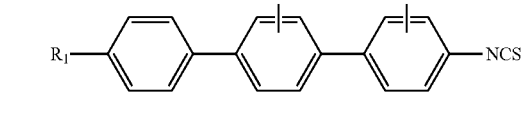
I-J
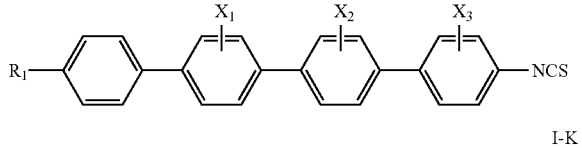
I-K
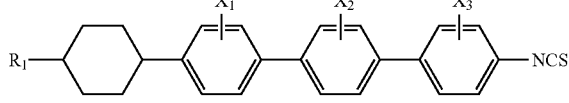
I-L
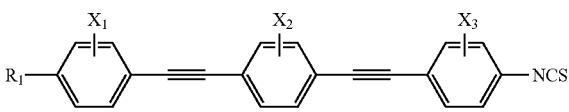
where I-A to I-J are further preferably selected from the group consisting of the following structures:
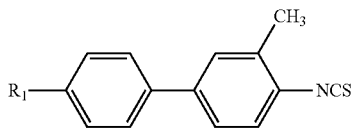
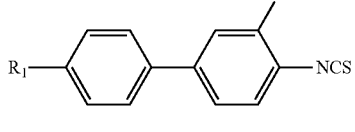
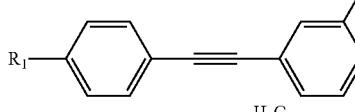
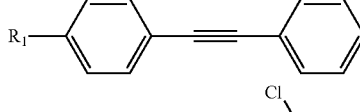
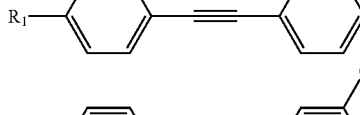
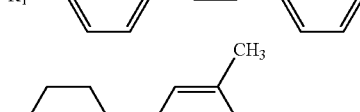
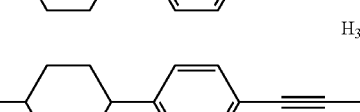
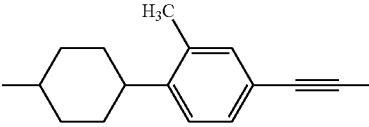
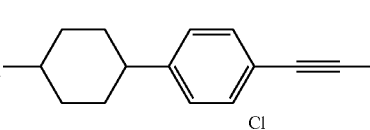
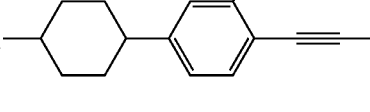

-continued
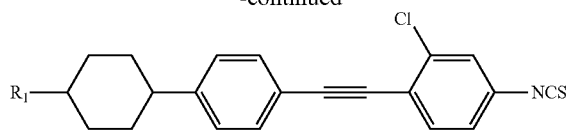
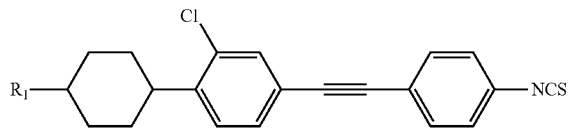
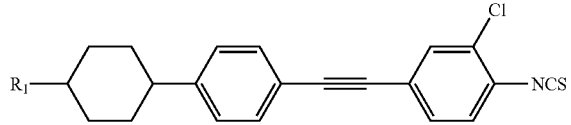
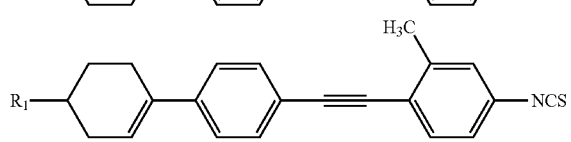
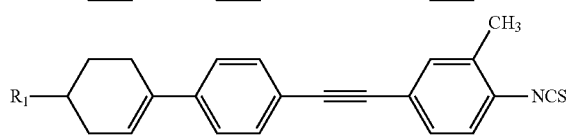
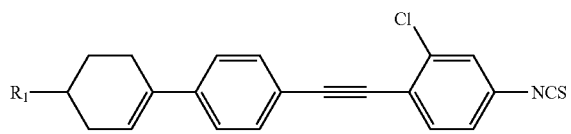
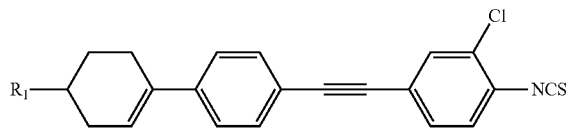
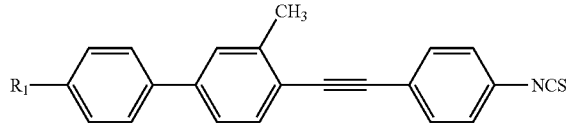
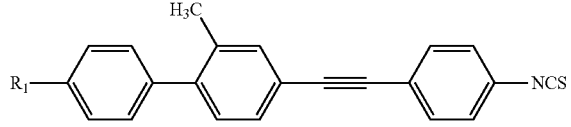
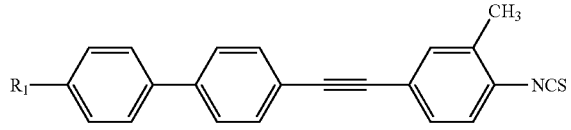
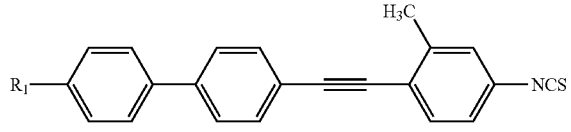
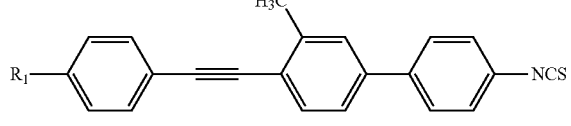
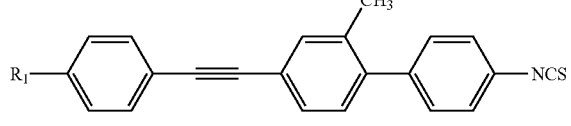
-continued
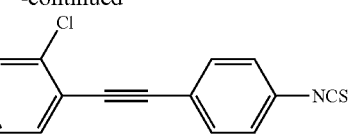
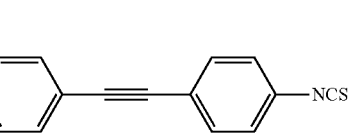
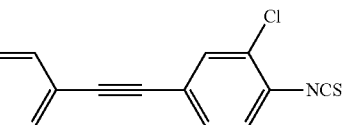
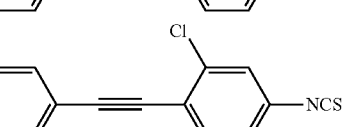
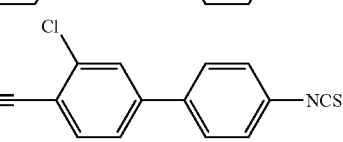
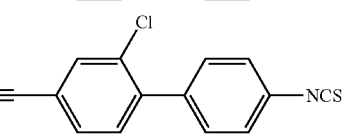
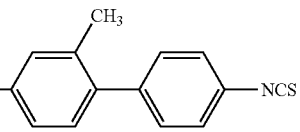
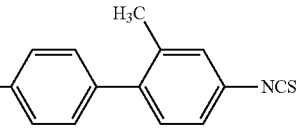
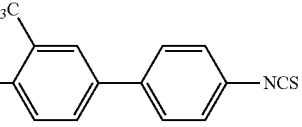
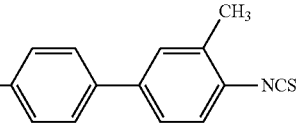
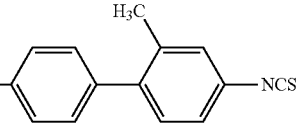
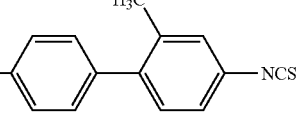
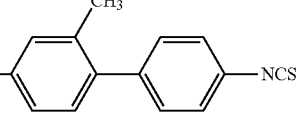

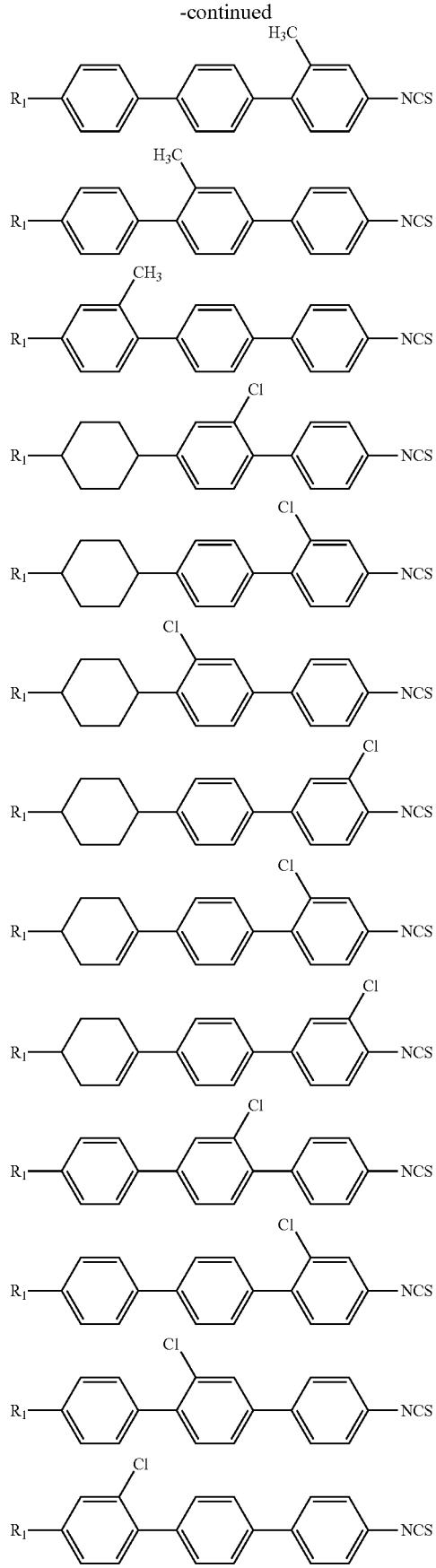
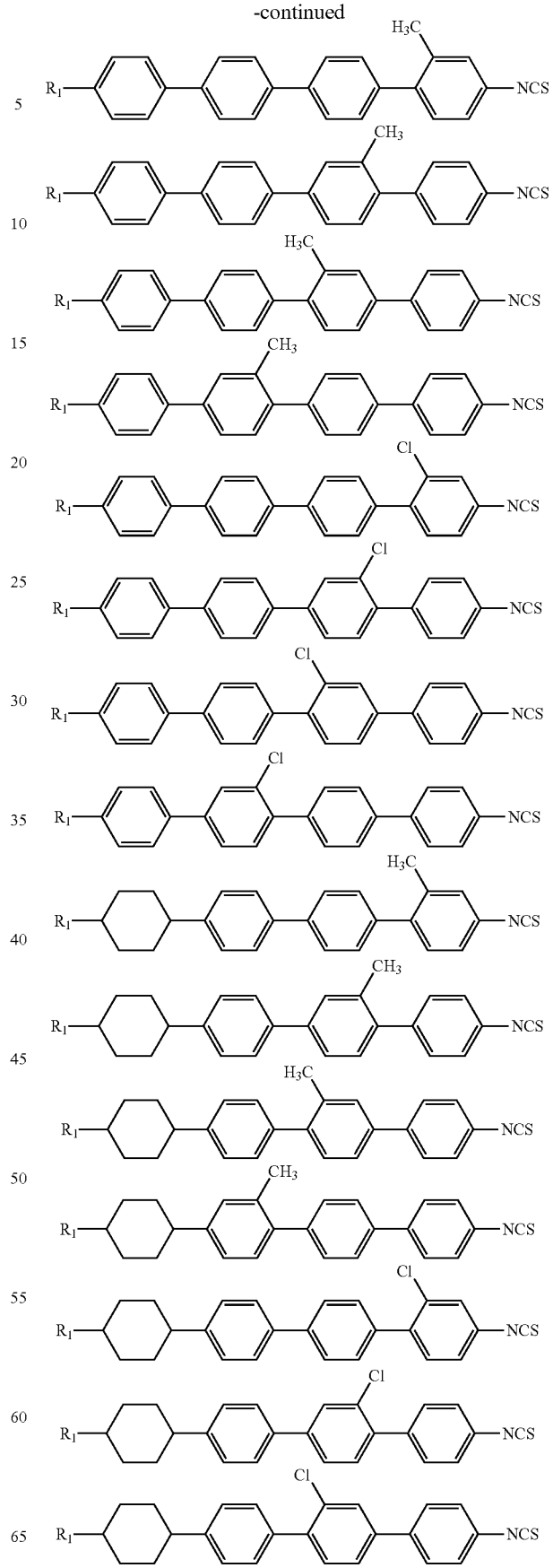

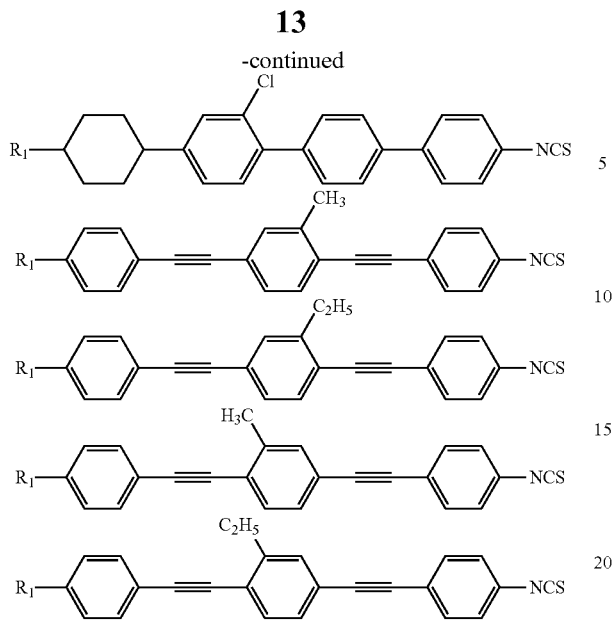

Compared with the high-frequency LC composition based on isothiocyano disclosed in the prior art, the compound shown in structural formula (I) is characterized in that there is no lateral fluorine substituent in a molecule. In the compounds shown in structural formula (I), methyl, ethyl, and chlorine, with relatively-large volume and relatively-weak polarity, serve as lateral substituents, which can greatly reduce the dielectric loss, reduce the melting point, and improve the low-temperature compatibility of the LC composition.

A compound shown in structural formula (II) further preferably has a structure selected from the group consisting of the following structures:

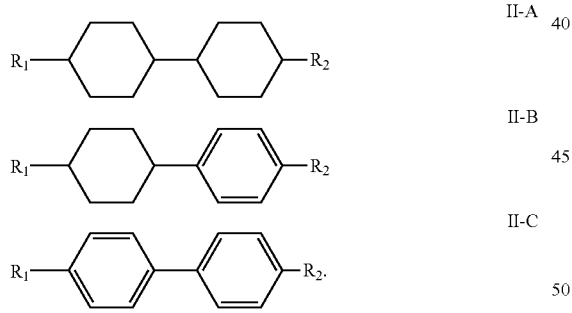

The compound shown in structural formula (II) is composed of two rings, and has the characteristics of low viscosity, low melting point, and low dielectric loss, which can further improve the low-temperature compatibility of the LC composition, greatly reduce the viscosity of the LC composition, and reduce the dielectric loss.

The structural formula II-A more preferably refers to the following specific compounds:

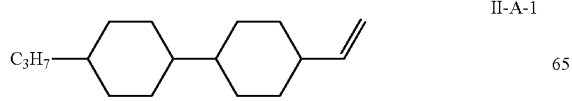

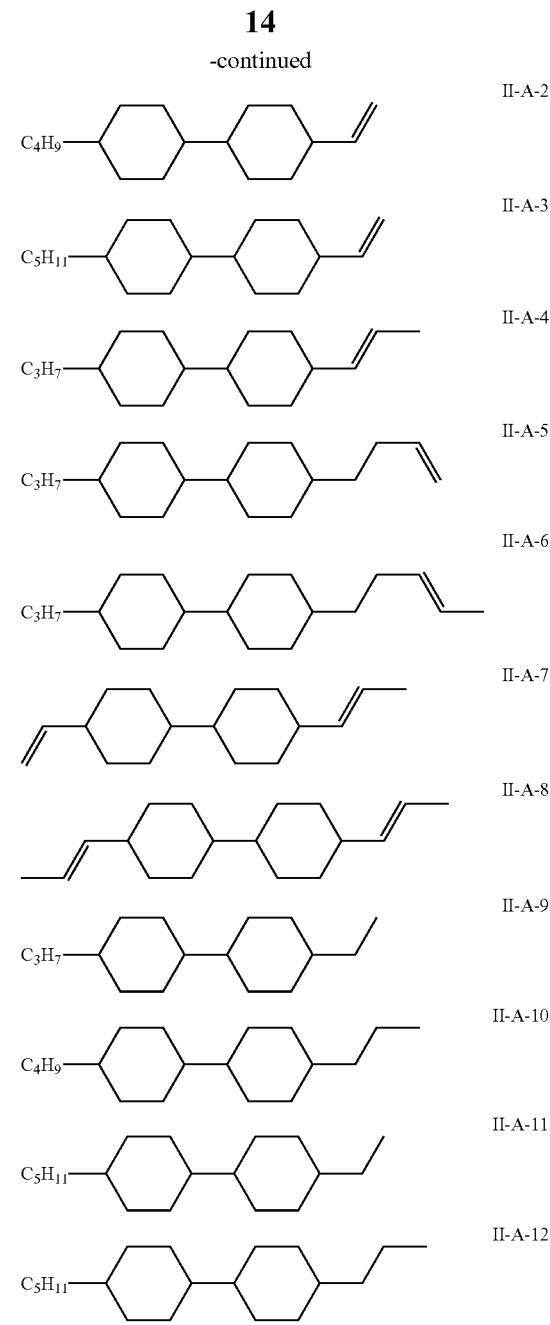

where II-B further preferably refers to the following structural compounds:

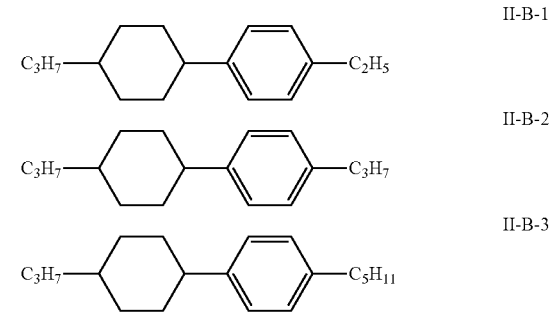

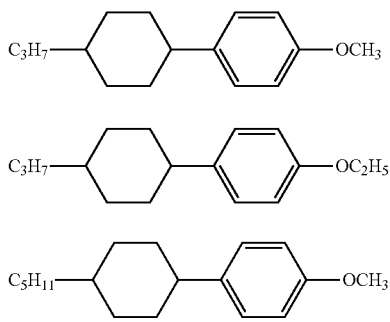
where II-C further preferably refers to the following structural compounds:
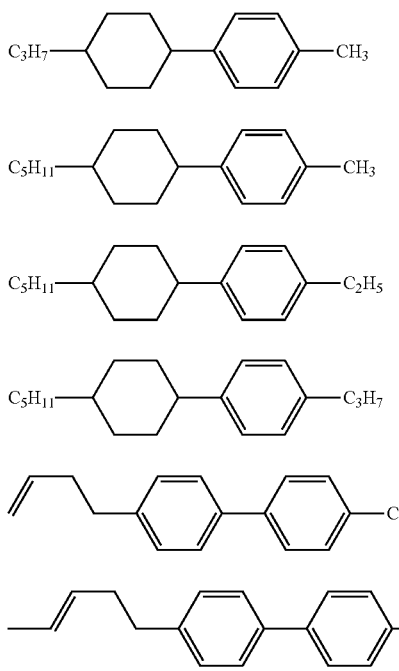
A compound shown in structural formula (III) preferably is a specific compound with the following structure:
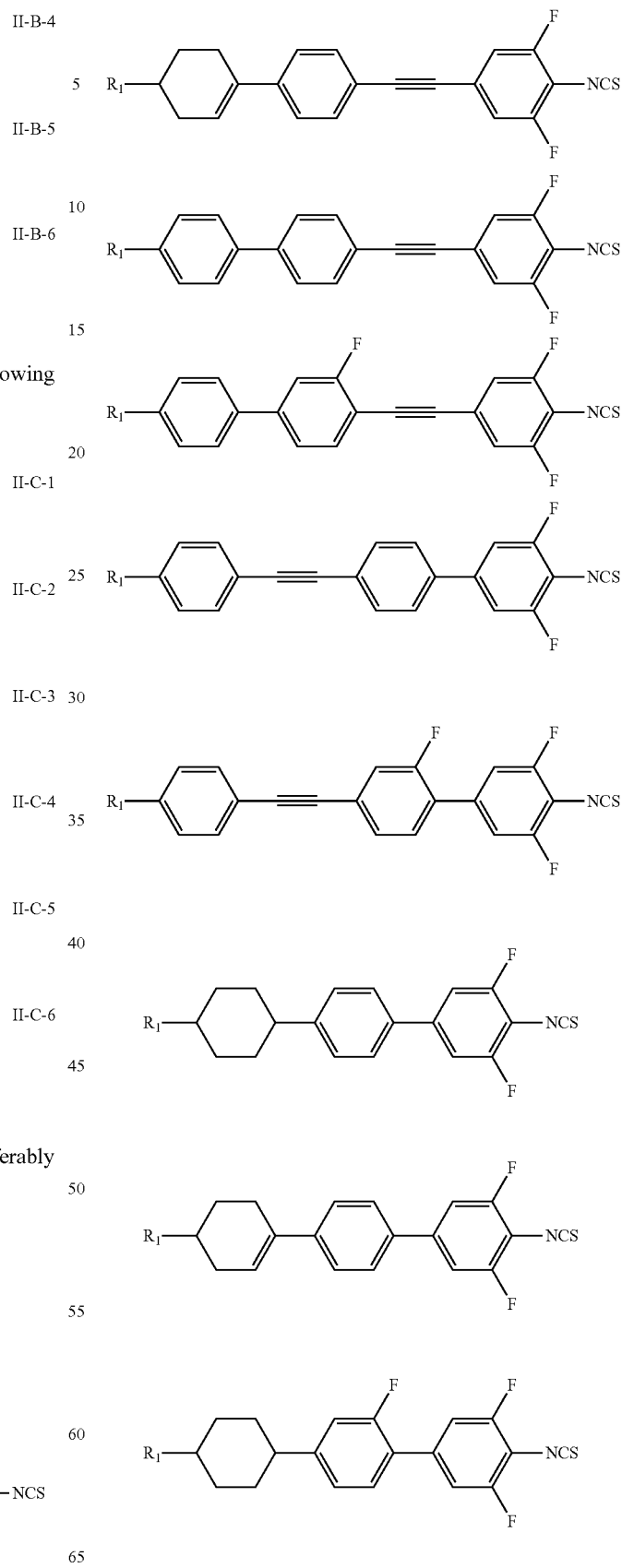

-continued

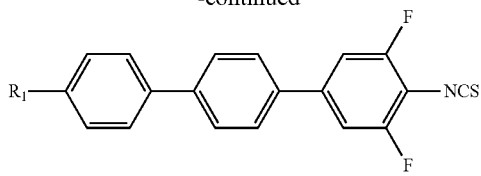

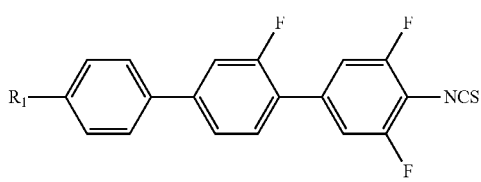

The compound shown in structural formula (III) has a wide LC phase range, low viscosity, and a large dielectric constant (especially at a low frequency of 1 KHz), which can adjust the LC phase range and low-frequency dielectric constant of the composition.

In a preferred embodiment of the present disclosure, the LC composition includes one or more selected from the group consisting of compounds shown in structural formula (I) and one or more selected from the group consisting of compounds shown in structural formula (II). In another preferred embodiment of the present disclosure, the LC composition includes one or more selected from the group consisting of compounds shown in structural formula (I), one or more selected from the group consisting of compounds shown in structural formula (II), and one or more selected from the group consisting of compounds shown in structural formula (III).

The LC composition according to the present disclosure preferably includes 50% to 99%, preferably 60% to 95%, and more preferably 70% to 90% (based on a total amount of the composition) of a compound shown in structural formula (I) and 1% to 40%, preferably 5% to 30%, and more preferably 10% to 20% (based on a total amount of the composition) of a compound shown in structural formula (II). The LC composition of the present disclosure may further include 0% to 30%, preferably 5% to 25%, and more preferably 10% to 20% (based on a total amount of the composition) of a compound shown in structural formula (III).

The LC composition according to the present disclosure may further include 0.001% to 1% of an additive, such as a 2,6-di-tert-butylphenol antioxidant and a light stabilizer T770.

The LC composition according to the present disclosure includes various compounds (preferably 3 to 20, more preferably 5 to 18, and more preferably 7 to 15 compounds). These compounds can be mixed in a conventional manner: the compounds each are weighed according to a predetermined mass proportion, then heated and thoroughly mixed through magnetic stirring or ultrasonic stirring until the components are completely dissolved, and then filtered. The LC composition can also be prepared in another conventional manner, for example, the so-called pre-mixture or so-called "multi-bottle" system is adopted, and components themselves in the system are ready-to-use mixtures.

The performance of LC at a high frequency is tested by a test method reported in the following literature: Penirschke, A. (2004). Cavity perturbation method for characterization of liquid crystals up to 35 GHz. Microwave Conference, 2004. 34th European.

LC is introduced into PTFE or fused quartz capillaries, and the packed capillaries are introduced into the middle of a chamber with a resonance frequency of 19 GHz. An input signal source is then applied, and a vector network analyzer is used to record a result of an output signal. Changes in resonance frequency and Q factor between the capillaries packed with the LC and blank capillaries are measured, and dielectric constant and loss tangent values are calculated. Dielectric constant components perpendicular and parallel to an LC orientation vector are obtained through alignment of LCs in a magnetic field, a direction of the magnetic field is set accordingly, and rotation is subsequently conducted by 90° accordingly.

The LC composition of the present disclosure has tunability T of preferably higher than or equal to 0.25 and more preferably higher than or equal to 0.30; a vertical dielectric loss tan $\delta_\perp$ of preferably less than or equal to 0.008 and more preferably less than or equal to 0.007; and a quality factor $\eta$ of preferably larger than or equal to 40 and more preferably larger than or equal to 50. The LC composition of the present disclosure has a nematic phase temperature range of preferably 0° C. to 90° C. or above and more preferably −10° C. to 100° C. or above; rotational viscosity γ1 of preferably less than or equal to 1,200 mPa·s and more preferably less than or equal to 1,000 mPa·s; and a dielectric constant of preferably larger than or equal to 7.0 and more preferably larger than or equal to 8.0 at a low frequency of 1 KHz.

The LC composition according to the present disclosure is very suitable for the fabrication of a microwave component, such as a phase shifter that can be tuned by applying an external magnetic or electric field. These phase shifters can work at a UHF-frequency band (0.3 GHz to 1 GHz), an L-frequency band (1 GHz to 2 GHz), an S-frequency band (2 GHz to 4 GHz), a C-frequency band (4 GHz to 8 GHz), an X-frequency band (8 GHz to 12 GHz), a Ku-frequency band (12 GHz to 18 GHz), a K-frequency band (18 GHz to 27 GHz), a Ka-frequency band (27 GHz to 40 GHz), a V-frequency band (50 GHz to 75 GHz), a W-frequency band (75 GHz to 110 GHz), and a frequency of up to 1 THz. The construction of the phase shifter according to the present disclosure is known to experts. Typically, loaded line phase shifters, inverted microstrip lines, or finline phase shifters and preferably antipodal finline phase shifters, slotted phase shifters, microstrip line phase shifters, or coplanar waveguide (CPW) phase shifters are used. These components enable a reconstructed antenna array.

"%" represents a mass percentage, and measured properties in the embodiments are as follows: Δn: birefringence anisotropy at 20° C. and 589 nm; $T_{ni}$: clearing point; Tm: melting point; $\gamma_1$: rotational viscosity at 20° C.; and Δε: dielectric anisotropy at 20° C., 1 KHz, and 19 GHz.

Example 1

TABLE 1

Composition in Example 1 and performance thereof

| Monomer structure | Mass proportion/% | Test data |
|---|---|---|
| C$_5$H$_{11}$—[phenyl]—C≡C—[phenyl(CH$_3$)]—NCS | 8 | Tcl = 147° C.<br>Tm ≤ −40° C.<br>Δε(20° C., 1 KHz) = 11.8<br>Δn(20° C., 589 nm) = 0.37<br>γ$_1$ = 890 mPa·s<br>ε$_\perp$(20° C., 19 GHz) = 2.55<br>ε$_{//}$(20° C., 19 GHz) = 3.70<br>Δε(20° C., 19 GHz) = 1.15<br>tan δ$_\perp$(20° C., 19 GHz) = 0.0054<br>tan δ$_{//}$(20° C., 19 GHz) = 0.0037<br>τ = 0.311<br>η = 57.6 |
| C$_3$H$_7$—[cyclohexyl]—[phenyl]—C≡C—[phenyl(H$_3$C)]—NCS | 5 | |
| C$_4$H$_9$—[cyclohexyl]—[phenyl]—C≡C—[phenyl(H$_3$C)]—NCS | 8 | |
| C$_5$H$_{11}$—[cyclohexyl]—[phenyl]—C≡C—[phenyl(H$_3$C)]—NCS | 9 | |
| C$_3$H$_7$—[phenyl]—[phenyl(CH$_3$)]—C≡C—[phenyl]—NCS | 4 | |
| C$_4$H$_9$—[phenyl]—[phenyl(CH$_3$)]—C≡C—[phenyl]—NCS | 6 | |
| C$_5$H$_{11}$—[phenyl]—[phenyl(CH$_3$)]—C≡C—[phenyl]—NCS | 10 | |
| C$_3$H$_7$—[phenyl]—[phenyl]—C≡C—[phenyl(H$_3$C)]—NCS | 5 | |
| C$_4$H$_9$—[phenyl]—[phenyl]—C≡C—[phenyl(H$_3$C)]—NCS | 10 | |
| C$_5$H$_{11}$—[phenyl]—[phenyl]—C≡C—[phenyl(H$_3$C)]—NCS | 10 | |

TABLE 1-continued

Composition in Example 1 and performance thereof

| Monomer structure | Mass proportion/% | Test data |
|---|---|---|
| 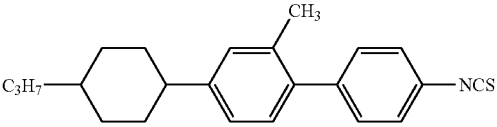 | 5 | |
| 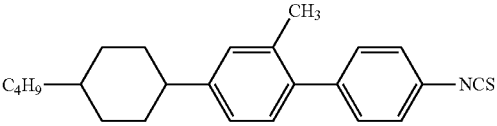 | 5 | |
| 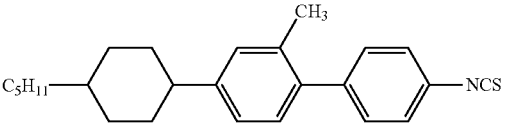 | 5 | |
| 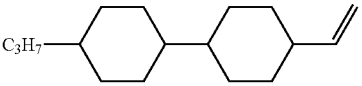 | 10 | |

Example 2

TABLE 2

Composition in Example 2 and performance thereof

| Monomer structure | Mass proportion/% | Test data |
|---|---|---|
| 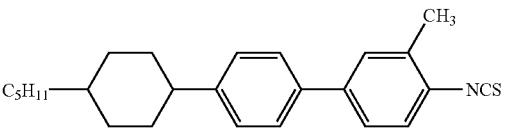 | 8 | Tcl = 157° C.<br>Tm ≤ −40° C.<br>Δε(20° C., 1 KHz) = 10.7<br>Δn(20° C., 589 nm) = 0.38<br>$\gamma_1$ = 890 mPa · s<br>$\varepsilon_\perp$(20° C., 19 GHz) = 2.42<br>$\varepsilon_{//}$(20° C., 19 GHz) = 3.51 |
| 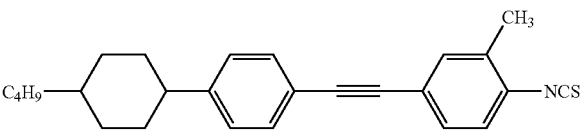 | 7 | Δε(20° C., 19 GHz) = 1.09<br>tan δ$_\perp$ (20° C., 19 GHz) = 0.0044<br>tan δ$_{//}$ (20° C., 19 GHz) = 0.0029<br>τ = 0.311<br>η = 70.6 |
| 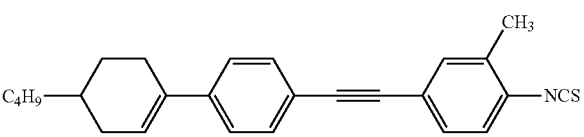 | 5 | |
| 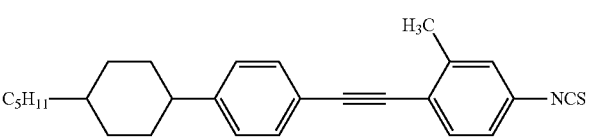 | 10 | |
| 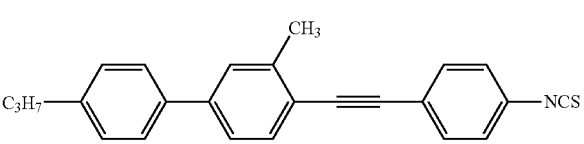 | 5 | |

TABLE 2-continued

Composition in Example 2 and performance thereof

| Monomer structure | Mass proportion/% | Test data |
|---|---|---|
| C₄H₉—[benzene]—[benzene(CH₃)]—C≡C—[benzene]—NCS | 5 | |
| C₅H₁₁—[benzene]—[benzene(CH₃)]—C≡C—[benzene]—NCS | 10 | |
| C₃H₇—[benzene]—[benzene]—C≡C—[benzene(H₃C)]—NCS | 5 | |
| C₄H₉—[benzene]—[benzene]—C≡C—[benzene(H₃C)]—NCS | 10 | |
| C₅H₁₁—[benzene]—[benzene]—C≡C—[benzene(H₃C)]—NCS | 10 | |
| C₃H₇—[benzene]—[benzene]—[benzene(H₃C)]—NCS | 5 | |
| C₅H₁₁—[benzene]—[benzene]—[benzene(H₃C)]—NCS | 5 | |
| C₃H₇—[cyclohexane]—[cyclohexane]—CH=CH₂ | 15 | |

Example 3

TABLE 3

Composition in Example 3 and performance thereof

| Monomer structure | Mass proportion/% | Test data |
|---|---|---|
| C4H9-cyclohexyl-phenyl-C≡C-(2-methylphenyl)-NCS | 10 | Tcl = 152° C. |
| C5H11-cyclohexyl-phenyl-C≡C-(2-methylphenyl)-NCS | 10 | Tm ≤ −30° C. |
| | | Δε(20° C., 1 KHz) = 9.2 |
| | | Δn(20° C., 589 nm) = 0.36 |
| | | $\gamma_1$ = 659 mPa · s |
| | | $\varepsilon_\perp$(20° C., 19 GHz) = 2.43 |
| | | $\varepsilon_{/\!/}$(20° C., 19 GHz) = 3.46 |
| | | Δε(20° C., 19 GHz) = 1.03 |
| | | tan δ $_\perp$(20° C., 19 GHz) = 0.0043 |
| | | tan δ $_{/\!/}$ (20° C., 19 GHz) = 0.0028 |
| | | τ = 0.298 |
| | | η = 69.2 |
| C3H7-phenyl-(3-methylphenyl)-C≡C-phenyl-NCS | 5 | |
| C4H9-phenyl-(3-methylphenyl)-C≡C-phenyl-NCS | 10 | |
| C4H9-phenyl-C≡C-(3-methylphenyl)-phenyl-NCS | 10 | |
| C4H9-phenyl-phenyl-C≡C-(2-methylphenyl)-NCS | 5 | |
| C5H11-phenyl-phenyl-C≡C-(2-methylphenyl)-NCS | 10 | |
| C7H15-phenyl-phenyl-C≡C-(2-methylphenyl)-NCS | 5 | |
| C5H11-phenyl-phenyl-(2-methylphenyl)-NCS | 15 | |
| C3H7-cyclohexyl-cyclohexyl-CH=CH2 | 15 | |

TABLE 3-continued

Composition in Example 3 and performance thereof

| Monomer structure | Mass proportion/% | Test data |
|---|---|---|
| 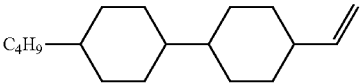 | 5 | |

Example 4

TABLE 4

Composition in Example 4 and performance thereof

| Monomer structure | Mass proportion/% | Test data |
|---|---|---|
| 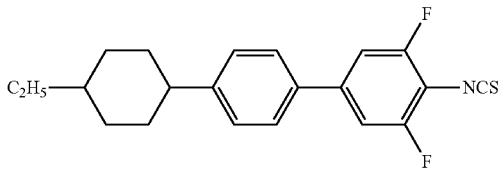 | 5 | Tcl = 132° C.<br>Tm ≤ −40° C.<br>Δε(20° C., 1 KHz) = 12.8<br>Δn(20° C., 589 nm) = 0.38<br>$\gamma_1$ = 664 mPa · s<br>$\varepsilon_\perp$(20° C., 19 GHz) = 2.47<br>$\varepsilon_{//}$(20° C., 19 GHz) = 3.61<br>Δε(20° C., 19 GHz) = 1.14<br>tan $\delta_\perp$(20° C., 19 GHz) = 0.0069<br>tan $\delta_{//}$ (20° C., 19 GHz) = 0.0046<br>τ = 0.316<br>η = 45.8 |
| 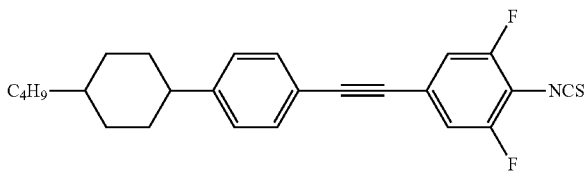 | 5 | |
| 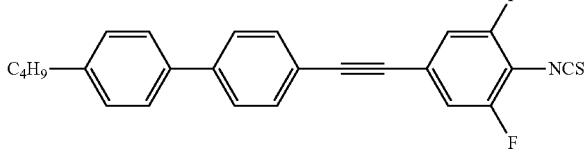 | 4 | |
| 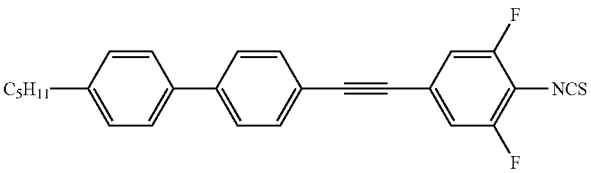 | 5 | |
| 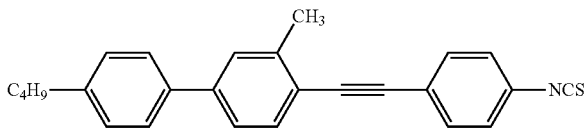 | 10 | |
| 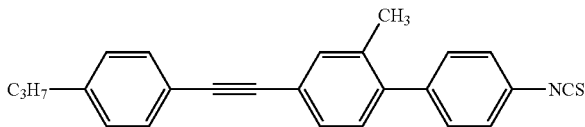 | 7 | |
| 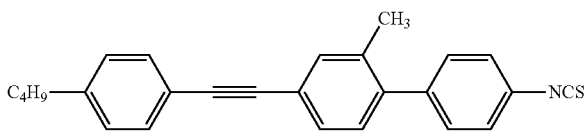 | 12 | |

TABLE 4-continued

Composition in Example 4 and performance thereof

| Monomer structure | Mass proportion/% | Test data |
|---|---|---|
| C$_5$H$_{11}$—[Ph]—C≡C—[Ph(2-CH$_3$)]—[Ph]—NCS | 12 | |
| C$_5$H$_{11}$—[Ph]—C≡C—[Ph(2-CH$_3$)]—NCS | 10 | |
| C$_4$H$_9$—[Ph]—[Ph(2-CH$_3$)]—[Ph]—NCS | 13 | |
| C$_3$H$_7$—[Cy]—[Cy]—CH=CH$_2$ | 12 | |
| C$_3$H$_7$—[Cy]—[Ph]—C$_3$H$_7$ | 5 | |

Example 5

TABLE 5

Composition in Example 5 and performance thereof

| Monomer structure | Mass proportion/% | Test data |
|---|---|---|
| C$_4$H$_9$—[Cy]—[Ph]—[Ph(2-Cl)]—NCS | 5 | Tcl = 157° C.<br>Tm ≤ −40° C.<br>Δε(20° C., 1 KHz) = 10.5<br>Δn(20° C., 589 nm) = 0.37<br>γ$_1$ = 794 mPa · s<br>ε$_⊥$(20° C., 19 GHz) = 2.48<br>ε$_{//}$(20° C., 19 GHz) = 3.57<br>Δε(20° C., 19 GHz) = 1.09<br>tan δ$_⊥$(20° C., 19 GHz) = 0.0055<br>tan δ$_{//}$ (20° C., 19 GHz) = 0.0036<br>τ = 0.305<br>η = 55.5 |
| C$_4$H$_9$—[Cy]—[Ph]—C≡C—[Ph(2-Cl)]—NCS | 8 | |
| C$_5$H$_{11}$—[Cy]—[Ph]—C≡C—[Ph(2-Cl)]—NCS | 7 | |

TABLE 5-continued
Composition in Example 5 and performance thereof
| Monomer structure | Mass proportion/% | Test data |
|---|---|---|
| 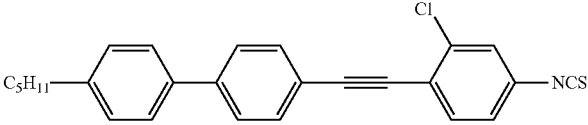 | 5 | |
| 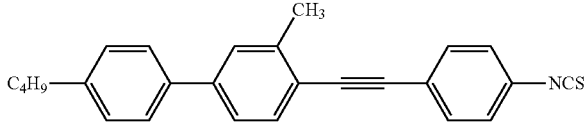 | 10 | |
| 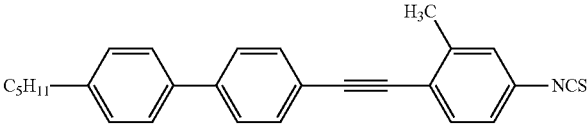 | 7 | |
| 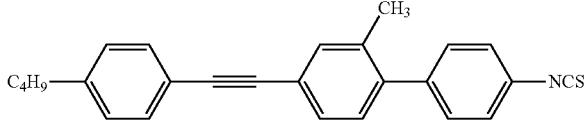 | 10 | |
| 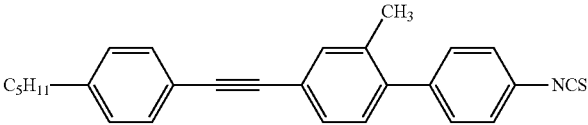 | 11 | |
| 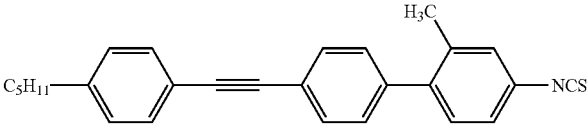 | 10 | |
| 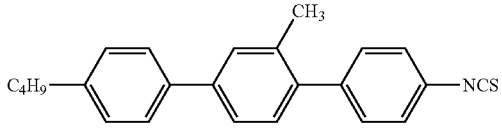 | 13 | |
| 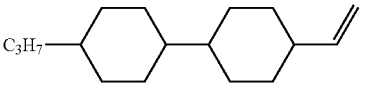 | 9 | |
| 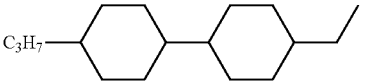 | 5 | |

Example 6

TABLE 6

Composition in Example 6 and performance thereof

| Monomer structure | Mass proportion/% | Test data |
|---|---|---|
| C4H9—[phenyl]—[phenyl]—[2-CH3-phenyl]—NCS | 4 | Tcl = 143° C.<br>Tm ≤ −40° C.<br>Δε(20° C., 1 KHz) = 10.8<br>Δn(20° C., 589 nm) = 0.35<br>$\gamma_1$ = 939 mPa · s<br>$\varepsilon_\perp$(20° C., 19 GHz) = 2.42<br>$\varepsilon_{//}$(20° C., 19 GHz) = 3.46<br>Δε(20° C., 19 GHz) = 1.04<br>tan $\delta_\perp$(20° C., 19 GHz) = 0.0039<br>tan $\delta_{//}$(20° C., 19 GHz) = 0.0022<br>τ = 0.301<br>η = 77.2 |
| C5H11—[phenyl]—[phenyl]—[2-CH3-phenyl]—NCS | 5 | |
| C7H15—[phenyl]—[phenyl]—[2-CH3-phenyl]—NCS | 5 | |
| C4H9—[cyclohexyl]—[phenyl]—C≡C—[2-CH3-phenyl]—NCS | 8 | |
| C5H11—[cyclohexyl]—[phenyl]—C≡C—[2-CH3-phenyl]—NCS | 9 | |
| C5H11—[cyclohexenyl]—[phenyl]—C≡C—[2-CH3-phenyl]—NCS | 5 | |
| C4H9—[phenyl]—[3-CH3-phenyl]—C≡C—[phenyl]—NCS | 5 | |
| C5H11—[phenyl]—[3-CH3-phenyl]—C≡C—[phenyl]—NCS | 7 | |
| C3H7—[phenyl]—[phenyl]—C≡C—[2-CH3-phenyl]—NCS | 4 | |

TABLE 6-continued

Composition in Example 6 and performance thereof

| Monomer structure | Mass proportion/% | Test data |
|---|---|---|
| C$_4$H$_9$—⌬—⌬—≡—⌬(H$_3$C)—NCS | 5 | |
| C$_5$H$_{11}$—⌬—⌬—≡—⌬(H$_3$C)—NCS | 8 | |
| C$_4$H$_9$—⌬—≡—⌬(C$_2$H$_5$)—≡—⌬—NCS | 10 | |
| C$_3$H$_7$—⌬—⌬—CH=CH$_2$ | 18 | |
| C$_5$H$_{11}$—⌬—⌬—C$_3$H$_7$ | 7 | |

Comparative Example 1

Patent CN107955630A discloses an LC composition for a high-frequency component, including a fluorine-substituted isothiocyano-containing LC compound. In Example 1 of this patent, the following composition and performance parameters thereof are disclosed:

| Monomer structure | Mass proportion/% | Test data |
|---|---|---|
| C$_3$H$_7$—⌬—⌬(F,F)—NCS | 20 | Tcl = 134° C.<br>Δε(20° C., 1 KHz) = 22.6<br>γ$_1$ = 324 mPa·s<br>ε$_\perp$(20° C., 19 GHz) = 2.3886<br>ε$_{//}$(20° C., 19 GHz) = 3.3697<br>tan δ$_\perp$ (20° C., 19 GHz) = 0.0128<br>tan δ$_{//}$ (20° C., 19 GHz) = 0.0069<br>τ = 0.291<br>η = 22.7 |
| C$_3$H$_7$—⌬—⌬(F)—⌬(F,F)—NCS | 15 | |
| C$_4$H$_9$—⌬—⌬(F)—⌬(F,F)—NCS | 15 | |

| Monomer structure | Mass proportion/% | Test data |
|---|---|---|
| 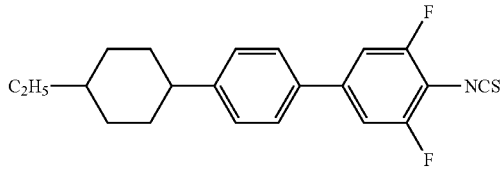 | 15 | |
| 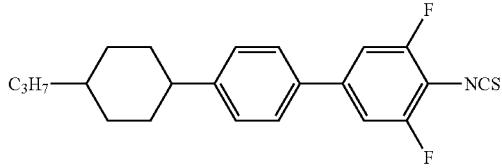 | 10 | |
| 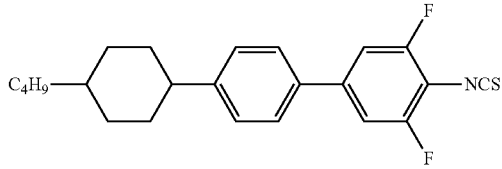 | 15 | |
| 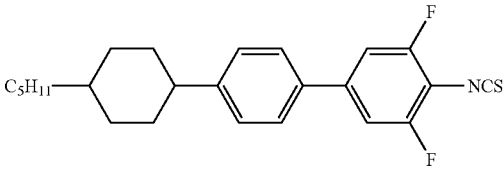 | 10 | |

Compared with Comparative Example 1, the examples of the present disclosure have significantly-reduced dielectric losses and multiplied quality factors.

Comparative Example 2

In Example 15 of Patent CN105368465A, a composition including fluorine-substituted isothiocyano-containing LC compound and properties thereof such as high-frequency dielectric constant are disclosed:

| Monomer structure | Mass proportion/% | Test data |
|---|---|---|
| 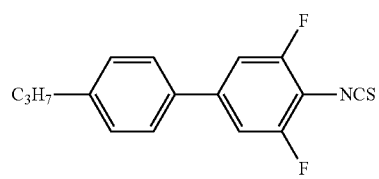 | 10 | Tcl = 126.5° C.<br>$\gamma_1$ = 297 mPa · s<br>$\varepsilon_\perp$(20° C., 19 GHz) = 2.36<br>$\varepsilon_{//}$(20° C., 19 GHz) = 3.44<br>tan $\delta_\perp$ (20° C., 19 GHz) = 0.0115<br>tan $\delta_{//}$ (20° C., 19 GHz) = 0.0065<br>$\tau$ = 0.313<br>$\eta$ = 27.2 |
| 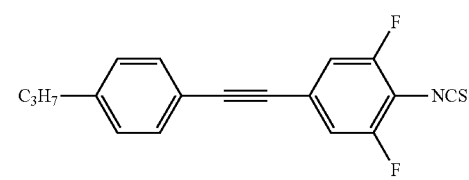 | 10 | |

| Monomer structure | Mass proportion/% | Test data |
|---|---|---|
| 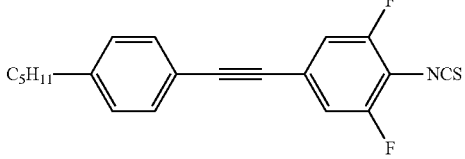 | 10 | |
| 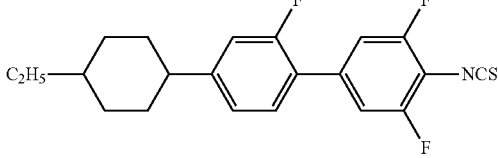 | 14 | |
| 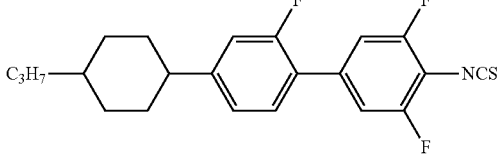 | 13 | |
| 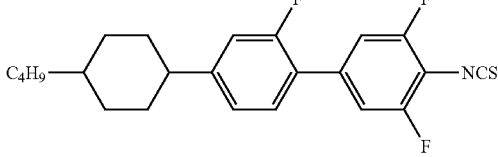 | 13 | |
| 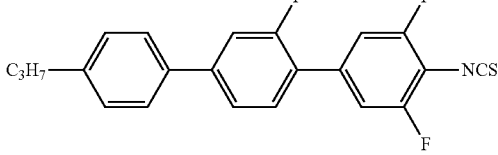 | 16 | |
| 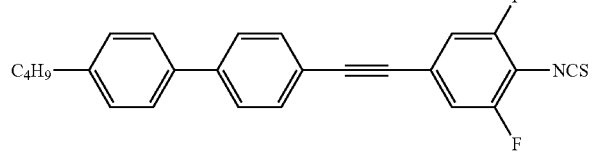 | 7 | |
| 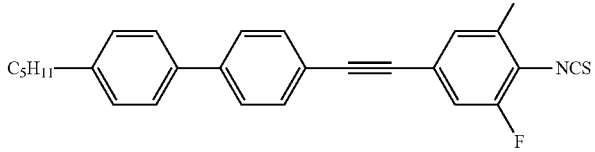 | 7 | |

Compared with Comparative Example 2, the examples of the present disclosure have significantly-reduced dielectric losses and multiplied quality factors.

Comparative Example 3

In Example N52 of Patent CN110499163A, a composition including fluorine-substituted isothiocyano-containing LC compound and properties thereof such as high-frequency dielectric constant are disclosed:

| Monomer structure | Mass proportion/% | Test data |
|---|---|---|
| C4H9—〔phenyl〕—〔phenyl〕—C≡C—〔2,6-difluorophenyl〕—NCS | 6 | Tcl = 159.1° C.<br>Δε(20° C., 1 KHz) = 14.0<br>γ₁ = 564 mPa · s<br>$\varepsilon_\perp$(20° C., 19 GHz) = 2.4198<br>$\varepsilon_{//}$(20° C., 19 GHz) = 3.6173<br>tan δ$_\perp$ (20° C., 19 GHz) = 0.0084<br>tan δ$_{//}$(20° C., 19 GHz) = 0.0052<br>τ = 0.331<br>η = 39.4 |
| C5H11—〔phenyl〕—〔phenyl〕—C≡C—〔2,6-difluorophenyl〕—NCS | 10 | |
| F3CO—〔phenyl〕—〔phenyl〕—〔2,6-difluorophenyl〕—NCS | 28 | |
| C3H7—〔cyclohexyl〕—〔phenyl〕—C≡C—〔2,6-difluorophenyl〕—NCS | 7 | |
| C4H9—〔cyclohexyl〕—〔phenyl〕—C≡C—〔2,6-difluorophenyl〕—NCS | 13 | |
| C5H11—〔cyclohexyl〕—〔phenyl〕—C≡C—〔2,6-difluorophenyl〕—NCS | 20 | |
| C5H11—〔2-ethylphenyl〕—C≡C—〔2,6-difluorophenyl〕—NCS | 16 | |

Compared with Comparative Example 3, the examples of the present disclosure have significantly-reduced dielectric losses and significantly-improved quality factors.

The above described are preferred implementations of the present disclosure, and it should be noted that those of ordinary skill in the art can make various improvements and modifications without departing from the technical principles of the present disclosure. These improvements and modifications should be regarded as falling within the protection scope of the present disclosure.

The invention claimed is:

1. A liquid crystal (LC) composition for a high-frequency component, comprising at least one compound represented by structural formula I and at least one compound represented by structural formula II:

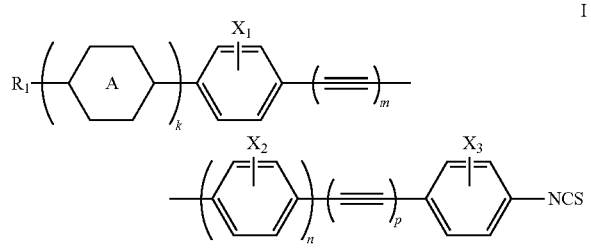

wherein in structural formula I, $R_1$ is one of: an alkyl with 1 to 10 carbon atoms, an alkenyl with 2 to 10 carbon atoms, a fluorinated alkyl, a fluorinated alkenyl, and a cycloalkyl;

k, m, n, and p are 0 or 1; when n=1, one of $X_1$, $X_2$, and $X_3$ is methyl or chlorine, and the other two are hydrogen; when n=0, one of $X_1$ and $X_3$ is methyl or chlorine, and the other one is hydrogen; and ring A of structural formula I is one of: benzene, cyclohexane, and cyclohexene;

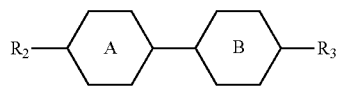

wherein in structural formula II, $R_2$ and $R_3$ each are selected from one of: an alkyl with 1 to 10 carbon atoms, an alkenyl with 2 to 10 carbon atoms, a fluorinated alkyl, a fluorinated alkenyl, a cycloalkyl, and a halogen;

ring A and ring B of structural formula II each are selected from one of: benzene, cyclohexane, and cyclohexene; and wherein a mass proportion of the compounds shown in structural formula (I) is 50% to 99% and a mass proportion of the compounds shown in structural formula (II) is 1% to 40%.

2. The LC composition according to claim 1, wherein the at least one compound represented by structural formula I comprises one or more selected from the group consisting of compounds represented by structural formulae I-A to structural formulae I-L:

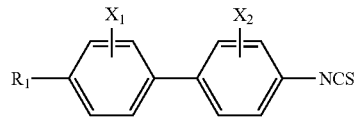

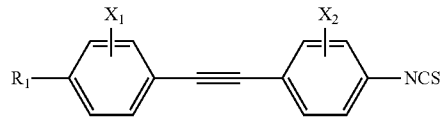

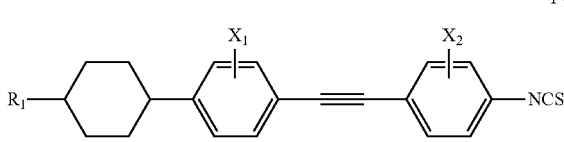

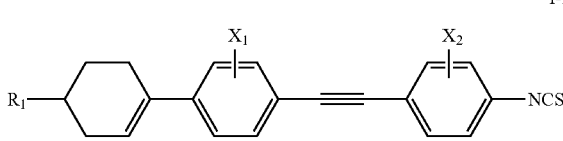

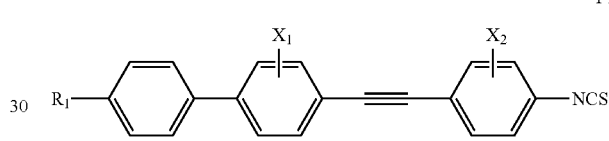

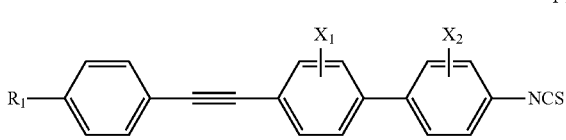

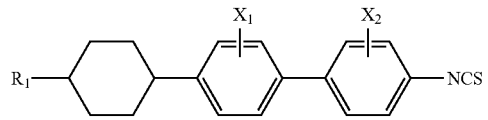

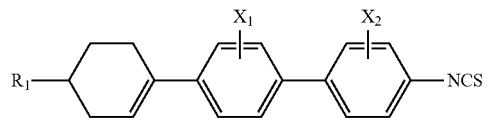

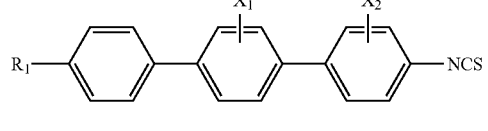

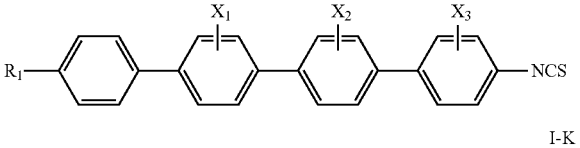

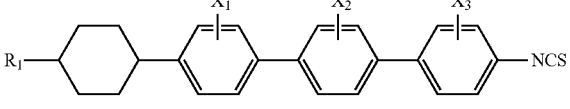

-continued

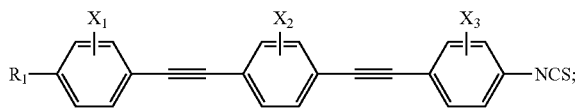
I-L wherein in structural formulae I-A to structural formulae I-L, $R_1$ is one of: an alkyl with 1 to 10 carbon atoms, an alkenyl with 2 to 10 carbon atoms, a fluorinated alkyl, a fluorinated alkenyl, and a cycloalkyl;
one of $X_1$, $X_2$ is methyl or chlorine, and the other one is hydrogen for structural formulae I-A~I-I; one of $X_1$, $X_2$, and $X_3$ is methyl or chlorine, and the other two are hydrogen for structural formulae I-J~I-L.

3. The LC composition according to claim 1, wherein the at least one compound represented by structural formula II is selected from the group consisting of compounds of formulae II-A, II-B, and II-C:

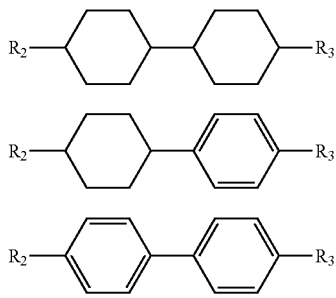

wherein in formulae II-A, II-B, and II-C, $R_2$ and $R_3$ each are selected from one of: an alkyl with 1 to 10 carbon atoms, an alkenyl with 2 to 10 carbon atoms, a fluorinated alkyl, a fluorinated alkenyl, a cycloalkyl, and a halogen.

4. The LC composition according to claim 1, further comprising at least one compound represented by structural formula III:

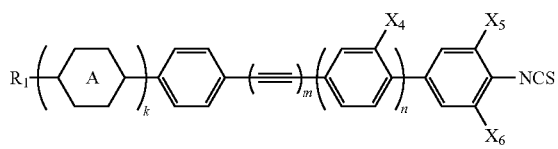
III wherein in structural formula III,
$R_1$ is one of: an alkyl with 1 to 10 carbon atoms, an alkenyl with 2 to 10 carbon atoms, a fluorinated alkyl, and a fluorinated alkenyl; $X_4$, $X_5$, and $X_6$ each are H or F; k, m, and n each are 0 or 1; and ring A of structural formula III is one of: benzene, cyclohexane, and cyclohexene; and
a mass proportion of the at least one compound represented by structural formula III is 0% to 30%.

5. The LC composition according to claim 1, wherein the LC composition further comprises 0.001% to 1% of an additive.

6. The LC composition according to claim 5, wherein the additive comprises a 2,6-di-tert-butylphenol antioxidant or a light stabilizer.

7. The LC composition according to claim 1, wherein the LC composition has a vertical dielectric loss value tan $\delta_\perp$ less than or equal to 0.008 and a quality factor η larger than or equal to 40.

8. A high-frequency component comprising the LC composition according to claim 1.

9. The LC composition according to claim 2, further comprising at least one compound represented by structural formula III:

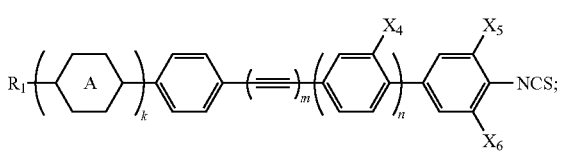
III wherein in structural formula III,
$R_1$ is one of: an alkyl with 1 to 10 carbon atoms, an alkenyl with 2 to 10 carbon atoms, a fluorinated alkyl, and a fluorinated alkenyl; $X_4$, $X_5$, and $X_6$ each are H or F; k, m, and n each are 0 or 1; and ring A of structural formula III is one of: benzene, cyclohexane, and cyclohexene; and
a mass proportion of the at least one compound represented by structural formula III is 0% to 30%.

10. The LC composition according to claim 3, further comprising at least one compound represented by structural formula III:

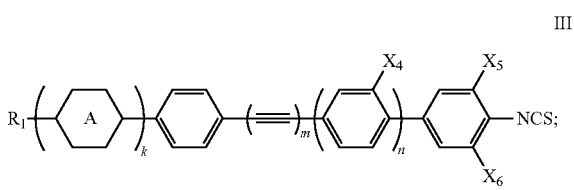
III wherein in structural formula III,
$R_1$ is one of: an alkyl with 1 to 10 carbon atoms, an alkenyl with 2 to 10 carbon atoms, a fluorinated alkyl, and a fluorinated alkenyl; $X_4$, $X_5$, and $X_6$ each are H or F; k, m, and n each are 0 or 1; and ring A of structural formula III is one of: benzene, cyclohexane, and cyclohexene; and
a mass proportion of the at least one compound represented by structural formula III is 0% to 30%.

11. A high-frequency component comprising the LC composition according to claim 2.

12. A high-frequency component comprising the LC composition according to claim 3.

13. A high-frequency component comprising the LC composition according to claim 4.

14. A high-frequency component comprising the LC composition according to claim 5.

* * * * *